(Model.)
2 Sheets—Sheet 1.
W. P. ELAM.
FEED BOX FOR SEED DRILLS.
No. 309,447. Patented Dec. 16, 1884.
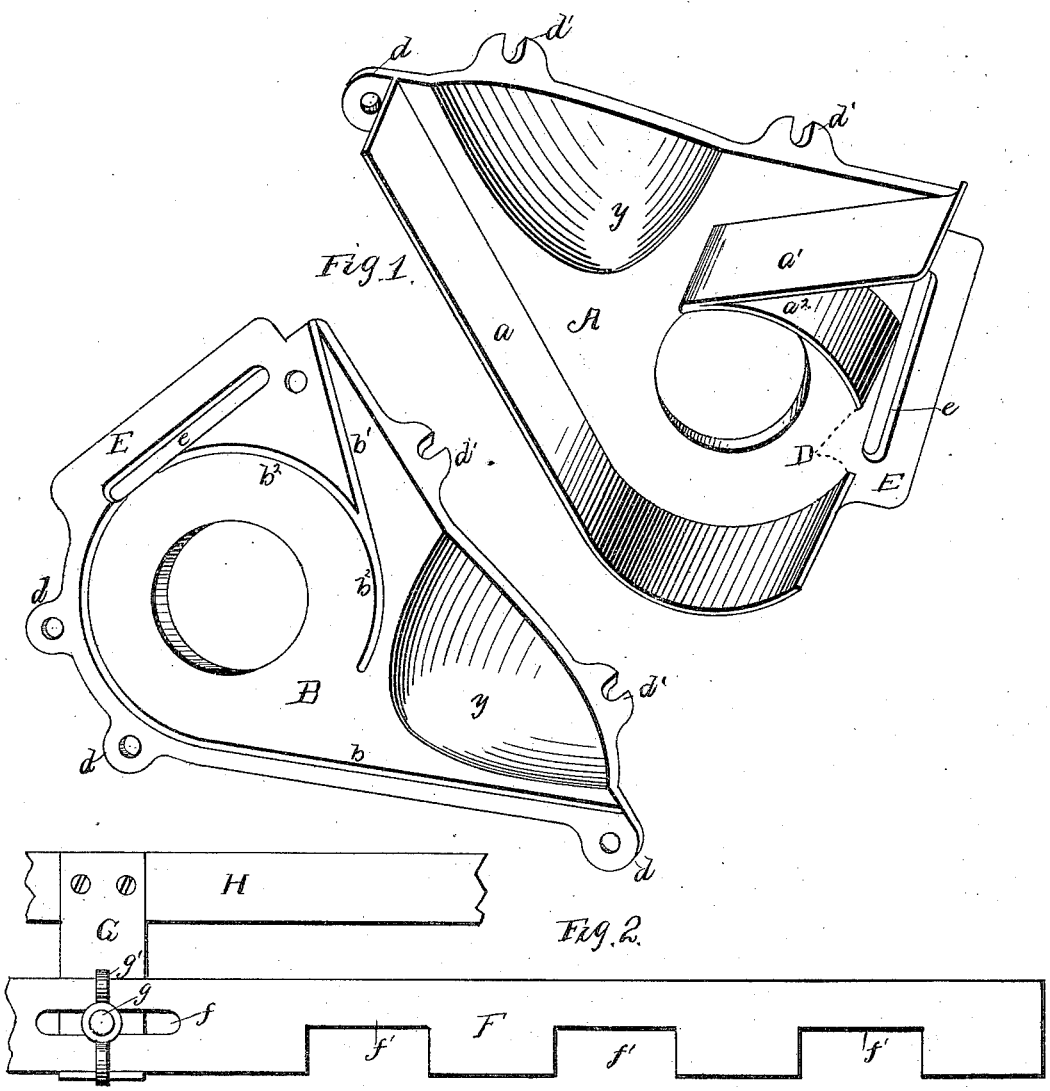

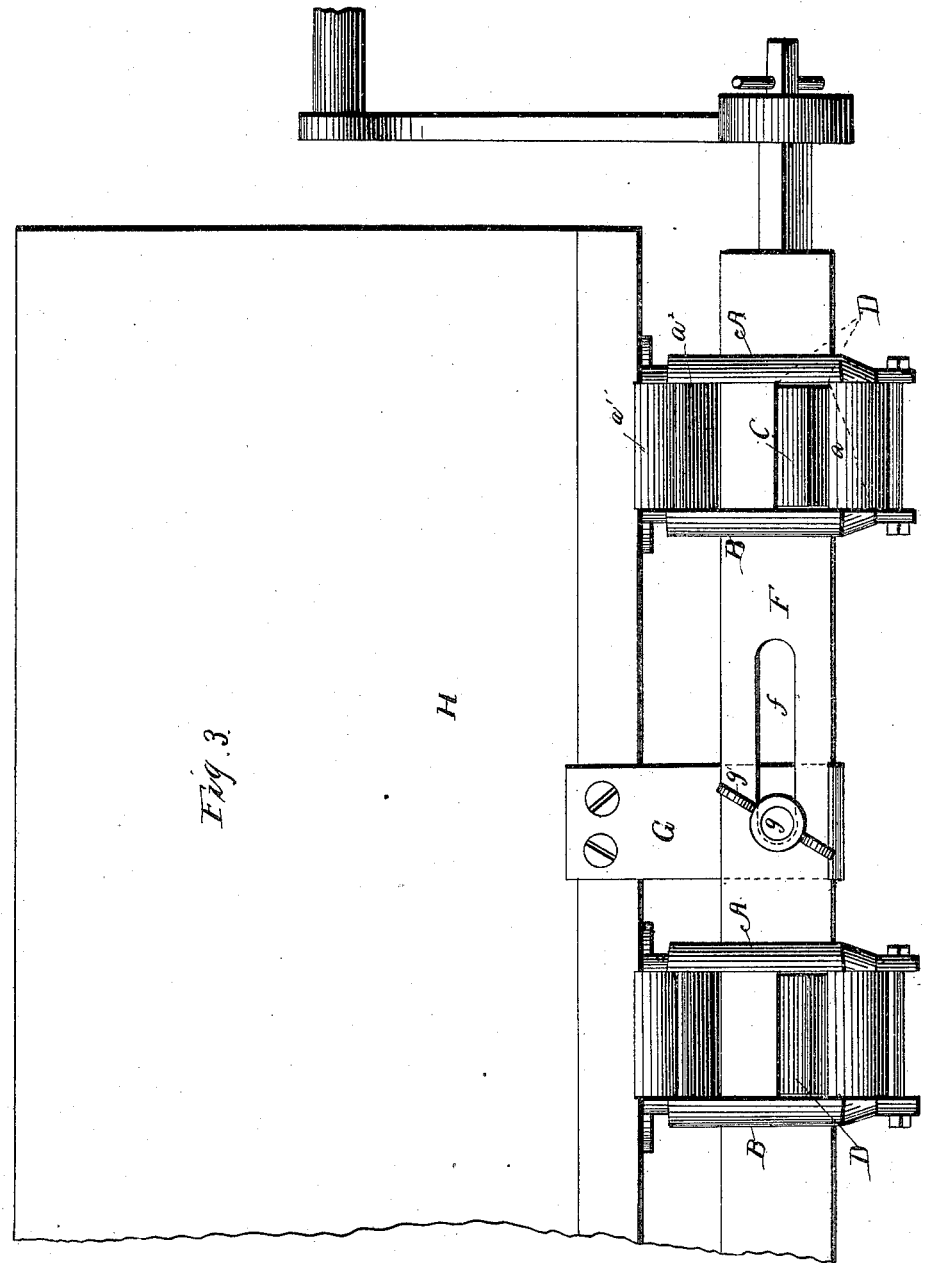

UNITED STATES PATENT OFFICE.

WILLOUGHBY P. ELAM, OF PETERSBURG, ILLINOIS.

FEED-BOX FOR SEED-DRILLS.

SPECIFICATION forming part of Letters Patent No. 309,447, dated December 16, 1884.

Application filed December 28, 1882. Renewed June 6, 1884. (Model.)

*To all whom it may concern:*

Be it known that I, WILLOUGHBY P. ELAM, a citizen of the United States, residing at Petersburg, in the county of Menard and State of Illinois, have invented certain new and useful Improvements in Feed-Boxes for Seed-Drills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a perspective view of the inside of the plates which compose the feed-cups. Fig. 2 is a longitudinal elevation of part of the adjustable feed-bar and its support, and Fig. 3 is a longitudinal elevation showing two of the feed-cups and feed-bar attached to a seed box or hopper.

This invention relates to that class of grain or seeding machines known as "force-feed," its object being to improve the construction of the feed-cup for which I obtained Letters Patent of the United States on the 22d day of August, 1882, No. 263,152, and to supply a feed-cup that is more easily and quickly set up and less expensive. Another object is to provide a notched feed-bar whereby the seed-discharge can be regulated without having to change spur or gear wheels; and my invention consists in certain details of construction and combination of parts, substantially as hereinafter more fully described, and particularly pointed out in the claims.

In carrying out my invention I cast a seed-cup in two parts, A and B. The part A is cast in one piece with the separating-plates $a$ $a'$ $a^2$. The plate $a'$ extends inwardly and downwardly, forming a chute to conduct the seed to the feed-wheel C. The plates $a$ $a^2$ converge at their outer edges, forming the seed-discharge opening D. The part B has three grooves, $b$ $b'$ $b^2$, which receive the edges of the plates $a$ $a'$ $a^2$. The seed-cup plates are cast with extensions E, having slots $e$, to receive the notched and adjustable seed-bar F, which is supported by one or more hangers, G, secured to the seed-box H. The seed-bar F is slotted, as at $f$, and is secured to the hanger G by means of a bolt, $g$, and thumb-screw $g'$. The seed-bar has notches $f'$, which are equal in width to the space between the side plates, A B. The feed-discharge is regulated by placing the seed-bar in such adjustment as to expose more or less of the seed-discharge opening D. In Fig. 3 the seed-bar is shown in position to give the maximum discharge. The parts A B are secured together by means of headed and nutted bolts or rods passed through perforated flanges $d$, formed thereon, and said parts are further supplied with slotted flanges or ears $d'$, to aid in securing the cup to the lower side of the seed-hopper. The feed-wheel C, which may be a ribbed cylinder or cog-wheel with short teeth, to force the grain or seed passing down into the cup having the wheel, receives motion from its shaft, driven by gearing or other suitable means of the seeder. If desired, the parts A B can be made to spring outwardly, as at $y$ $y$.

I am aware that slotted cups through which wings attached to a rod having an indicator to show how far the wings have entered the cups to regulate the discharge are not new.

I am also aware that cut-offs adapted to move across the grain-channel of the cups to widen or narrow the same, the cut-offs being between the discharge-opening in the hopper and the feed-wheels, are not new.

I am also aware that it is not new to place a valve pivoted at one end to the exterior face of the feed-cup, and its opposite end connected to a link which is operated by a rock-shaft having a crank-arm.

I am also aware that it is not new to provide a seed-discharge opening in a feed-cup exteriorly to the feed-wheel, and to increase or decrease the size of the discharge-opening by means of a slide held within V-shaped grooves in the edges of the discharge-opening.

What I claim, and desire to secure by Letters Patent, is—

1. A seed-cup cast in two parts, one part having the separating-plates cast integral therewith, and the other part having coincident grooves to receive the edges of said separating-plates, substantially as shown and described.

2. A seed-cup, substantially such as herein shown and described, having extensions cast therewith, and slotted to receive an adjustable seed-bar, said extensions being placed exteriorly to the converging ends of the separating-plates $a\ a^2$.

3. A seed-cup having the separating and converging plates $a\ a^2$, in combination with an adjustable seed-bar arranged exteriorly to the feed-wheel and the outer converging ends of said plates, as and for the purpose set forth.

In testimony whereof I affix my signature in presence of two witnesses.

WILLOUGHBY P. ELAM.

Witnesses:
  C. EVEREST ELLIOTT,
  O. B. CARTER.